(12) United States Patent
Hauser

(10) Patent No.: US 6,761,954 B2
(45) Date of Patent: Jul. 13, 2004

(54) REINFORCED FLEXIBLE LAMINATE SEALING STRIP AND METHOD OF MANUFACTURING SAME

(75) Inventor: Bruce H. Hauser, Lincoln, RI (US)

(73) Assignee: Hauser International Group, Lincoln, RI (US)

( * ) Notice: Subject to any disclaimer, the term of this patent is extended or adjusted under 35 U.S.C. 154(b) by 0 days.

(21) Appl. No.: 10/075,788

(22) Filed: Feb. 13, 2002

(65) Prior Publication Data

US 2002/0119284 A1 Aug. 29, 2002

Related U.S. Application Data

(60) Provisional application No. 60/271,804, filed on Feb. 27, 2001.

(51) Int. Cl.[7] .................................................. B32B 5/00
(52) U.S. Cl. ........................ 428/108; 428/122; 49/475.1; 49/490.1
(58) Field of Search ................................ 428/105, 108, 428/122; 49/475.1, 490.1

(56) References Cited

U.S. PATENT DOCUMENTS

| | | | |
|---|---|---|---|
| 1,733,880 A | 10/1929 | Hurxthal | |
| 3,091,821 A | 6/1963 | Cook, Jr. | 20/74 |
| 3,165,793 A | 1/1965 | Lynch | 20/69 |
| 3,699,718 A | 10/1972 | Kimura | 49/491 |
| 4,099,765 A | 7/1978 | Bright | 296/93 |
| 4,188,424 A | 2/1980 | Ohno et al. | 428/572 |
| 4,271,634 A | 6/1981 | Andrzejewski | 49/491 |
| 4,304,816 A | 12/1981 | Bright et al. | 428/358 |
| 4,310,164 A | 1/1982 | Mesnel | 277/189 |
| 4,343,845 A | 8/1982 | Burden et al. | 428/122 |
| 4,399,644 A | 8/1983 | Bright | 52/716 |
| 4,413,033 A | 11/1983 | Weichman | 428/122 |
| 4,424,976 A | 1/1984 | Hayashi | 277/205 |
| 4,749,203 A | 6/1988 | Bright | 277/184 |
| 4,830,898 A | 5/1989 | Smith | 428/122 |
| 4,970,101 A | 11/1990 | Keys | 428/110 |
| 4,982,529 A | 1/1991 | Mesnel | 49/491 |
| 5,072,567 A | * 12/1991 | Cook et al. | 428/122 |
| 5,204,157 A | * 4/1993 | Matsumiya | 428/105 |
| 6,150,003 A | 11/2000 | McCutchan, Jr. | 428/105 |
| 6,189,198 B1 | 2/2001 | Keeney et al. | 29/527.4 |
| 6,461,713 B2 | * 10/2002 | King | 428/108 |

FOREIGN PATENT DOCUMENTS

EP    0 381 889 B1    4/1994    .......... B60R/13/04

* cited by examiner

Primary Examiner—Alexander S. Thomas
(74) Attorney, Agent, or Firm—Barlow, Josephs & Holmes, Ltd.

(57) ABSTRACT

The present invention provides a laminate flexible strip for attachment to a vehicle in the form of a weather sealing strip. The strip includes a core member and a filler layer of elastomeric seal material disposed about and into the voids of the core member. The core member includes a bent wire in an undulating pattern that forms a number of continuously connected longitudinally spaced and laterally extending u-shaped metal clamping clips for reinforcing the seal material and a number of continuous laterally spaced and longitudinally extending linear fibers connected to the clips to maintain the spatial relationship between the bent wire members. While the fibers or laminate maintain the longitudinal spacing of the wires, they also allow the core to flex laterally and compress longitudinally in the finished extrusion. The fibers may be made of the same material as or a material dissimilar to the clips.

23 Claims, 12 Drawing Sheets

REINFORCED FLEXIBLE LAMINATE SEALING STRIP AND METHOD OF MANUFACTURING SAME

PRIORITY CLAIM TO EARLIER FILED APPLICATION

This application claims the benefit of Provisional Application No. 60/271,804, filed Feb. 27, 2001.

BACKGROUND OF THE INVENTION

The instant invention relates to reinforced sealing materials. More particularly the present invention relates to a reinforced laminate sealing strip and a method of manufacturing such a sealing strip type that is commonly utilized in sealing the edges of various parts of an automobile in mated fashion to one another.

For example, glass windows need to be sealed when in communication with the door frame. Most automotive doors have a body envelope that is created by two door panels, an inner and an outer which are generally in parallel spaced-apart relation to one another. An extendable pane of window glass is nested in the parallel opening between the door panels. In addition, a window regulator is provided for selectively moving the glass pane in and out of the door envelope to open and close the window opening of the door. In many vehicles, the vehicle door includes a door window frame extending from the top of the door panels and extending over the top of the window opening for enclosing the window. This door window frame has a seal, typically called weather stripping, which is installed into the door window frame to seal the perimeter edges of the window glass when the window glass is in its uppermost position.

Additionally, a weather stripping seal of similar construction is employed in other locations around the vehicle where a weather tight seal is required between an operable component of the vehicle and the vehicle body such as the trunk lid and the doors. In these locations, generally a metal fin is formed as part of the vehicle body panels around the perimeter of these openings. The sealing material is compressed between the body panels and the operable component to form a weather tight seal when the component is in a closed position.

A typical weather sealing strip has a U-shaped retention portion that contains a reinforcing carrier and is installed over an edge of the sheet metal of the door window frame or other body opening that surrounds the perimeter of the opening. Connected with the retention portion is a portion of the weather stripping referred to as the sealing member or the glass seal. The sealing member is typically shaped as an inverted U-shaped section with respect to the retention portion or a compressible bulbous section and is laterally joined thereto. The glass seal typically has flocked wings, which seal against the side of the glass when the glass is in the closed position and inserted within the U shape of the glass seal. The bulbous type profile is typically compressed against the operable component when the component is in a closed position.

The carrier is typically reinforced by a roll formed or stamped thin metal member. Typical materials utilized for the carrier reinforcement are cold rolled steel, stainless steel or aluminum. After the carrier is formed, it is passed through an extruder and covered with a polymeric material, typically an elastomeric material such as rubber. The interior of the retention portion may or may not have formed barbs to assist the weather stripping in retaining itself to the sheet metal of the door once it is pushed over the edge of the sheet metal.

In most vehicles however, the openings around the windows and doors do not have edges that are square or parallel to opposing edged thereto and the corners are typically radiused. For example, the lateral edge of a front door window frame at the front end is inclined due to the inclination of the automobile's "A" pillar. The door window frame, generally rearward of the "A" pillar, curves into a second horizontal linear section called the header which usually runs longitudinal with the vehicle. A third linear section of the door window frame is oriented generally vertically and is usually conformed to the shape of the "B" pillar. Between the "A" pillar and the top of the door window frame, is a first curved section. Between the top of the door window frame and the "B" pillar portion of the window opening is a second curved section. Most carrier materials, which are formed using thin metal reinforcement, are not flexible enough to bend to conform to the small radiuses of the curves of the door window frame. Therefore, in these applications, a first length of weather stripping is utilized to seal the first linear section of the window. A second length of weather stripping is used to seal the second linear section of the window, and a third length of weather stripping was utilized to seal the third linear section.

Many known door windows require an additional molded joint component to be installed between two linear sections to seal the curved sections. The molded joint however has a dissimilar cross-section than that of the adjoining linear sections. Another method used to seal the radius sections is to notch the carrier to allow it to fold and then mold a polymeric patch into the notched area. The prior sealing systems either do not provide a constant sectioned extrusion through the corners and therefore lack firm retention to a seal-mounting flange of the door window frame at these locations, or are limited to relatively large radiuses, which would otherwise cause seal wrinkling or buckling. Lack of retention to the seal to the mounting flange or wrinkling or buckling of the seal degrades the integrity of the seal. Also, without additional operations, many molded corners lack the low friction areas between the window glass and seal. The lack of low friction causes squeaks and mandates that higher window regulator forces be utilized to ensure closure of the window.

While in most instances, the metal used as the carrier within the extruded seal, such as stamped metal reinforcing, is not flexible enough to corner through the small radius required. Most carrier material, that is flexible enough to corner through the small radius, does not have the tensile strength required to process the carrier material through the roll forming mill or the polymer injection molding and/or extruding processes. Prior art attempts to overcome these difficulties include the replacement of the stamped or rolled metal reinforcing carrier with an undulating knitted wire material. Since the undulating wire has little tensile strength, the knitted or woven fabric material is added between each pass of the wire to provide longitudinal stability and maintain the spacing of the wires as the carrier is subjected to the extrusion process. In these instances, the equipment required to weave the fabric carriers with the wire strand is expensive and requires a high degree of calibration and maintenance thus increasing the cost and manufacturing time required to produce the reinforcing material. In addition, the reinforcing carriers are generally produced by one manufacturer and supplied to another manufacturer as raw material for further extrusion and incorporation into a finished weather stripping product.

Finally, in all of the prior art weather stripping materials, the reinforcing carrier material is directly crosshead extruded into the finished product. While this process proves to be expedient from a manufacturing standpoint, the finished product tends to have ribbed pattern that appears in the surface of the finished extrusion corresponding to the locations of the reinforcing members. This appearance is referred to as the "hungry horse" and is aesthetically unattractive and, therefore, not considered desirable in the weather stripping industry.

It is therefore desirable to provide a process that provides a reinforcing web that can be employed as raw material for further extruding weather stripping. It is a further object of the present invention to provide a reinforcing carrier that maintains longitudinal stability during the fabrication process while allowing the required flexibility required in the finished product. It is another object of the present invention to provide a reinforcing carrier that can be incorporated into a weather stripping extrusion that minimizes or eliminates the "hungry horse" appearance.

SUMMARY OF THE INVENTION

In this regard, the present invention provides a laminate flexible strip for attachment to a vehicle in the form of a weather stripping gasket. The strip includes a core member and a cover layer of elastomeric material disposed about the core member. The core member includes a bent wire in an undulating pattern that forms a plurality of continuously connected longitudinally spaced and laterally extending U-shaped metal clamping clips for reinforcing the seal material and a plurality of continuous laterally spaced and longitudinally extending linear fibers connected to the clips to maintain the spatial relationship between the bent wire members. While the fibers maintain the longitudinal spacing of the wires, they also allow the core to flex laterally and compress longitudinally in the finished extrusion. The fibers may be made of the same material as or a material dissimilar to the clips.

The clips are evenly spaced and alternately attached to one another on the right and left sides in linear sequence and include apertures formed between the parallel clip members in a continuously connected pattern. This undulating pattern is preferably formed of wire that is bent using a wire-bending machine. The continuously connected clips are simply laid onto the fibers, or other longitudinal carrier material, and may be secured by an adhesive potting laminate, a thermosetting resin or by welding as the fiber material indicates. A filler material is filled in the apertures to create a ribbon that presents a smooth, continuous outer surface. In other words, the filler material is disposed in the apertures between the clips to eliminate the "hungry horse" effect when the ribbon of the present invention is incorporated into a finished weather stripping gasket in further extrusion processes.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
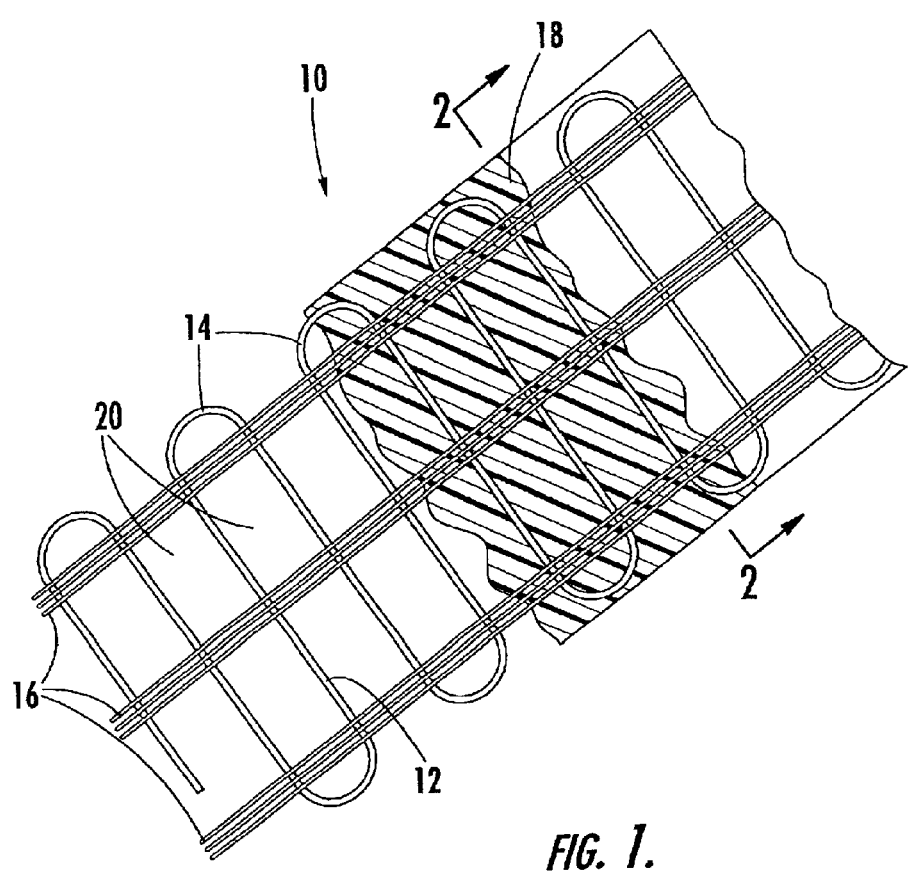
FIG. 1 is a partially cut away perspective view of the reinforced flexible laminate strip of the present invention.
Figure 2:
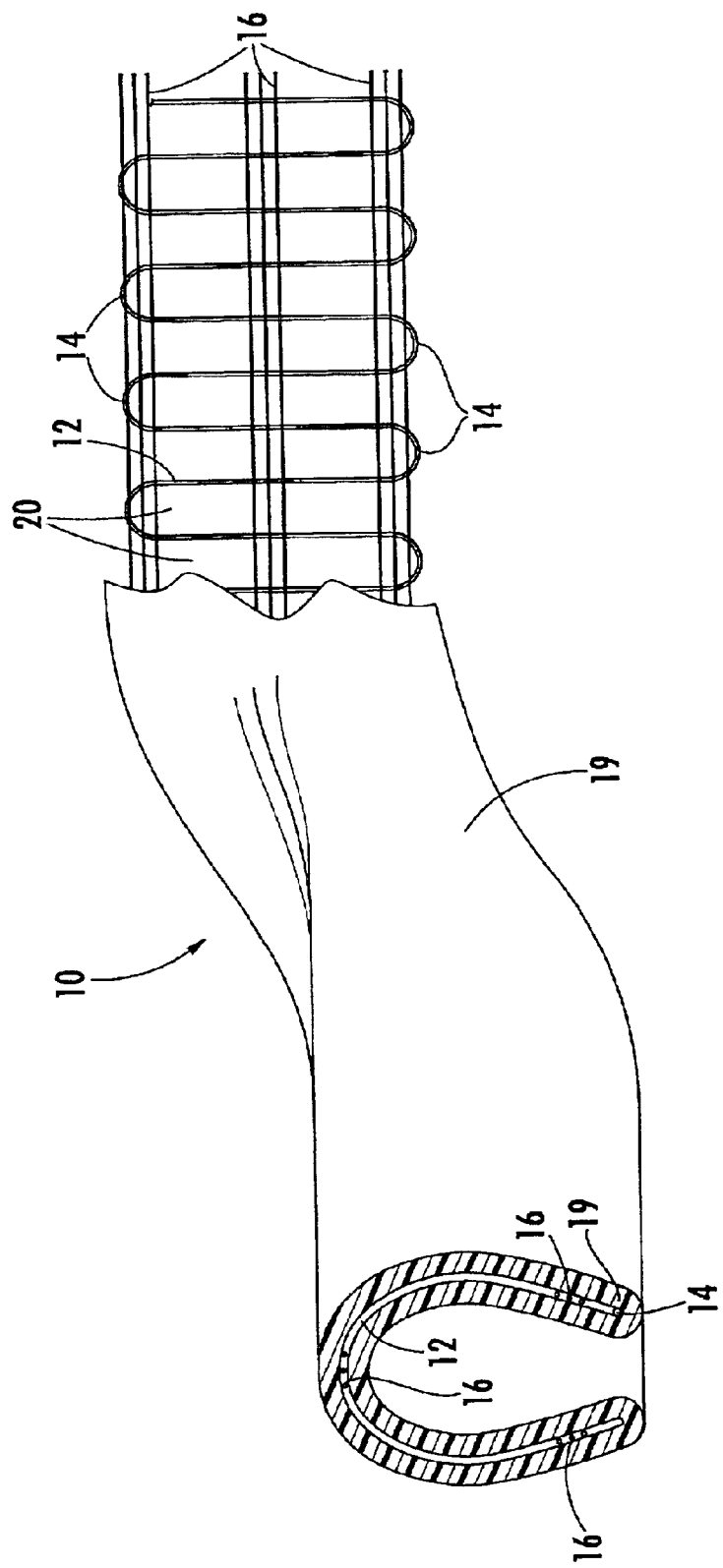
FIG. 2 is a partially cut away perspective view of the reinforced flexible laminate strip of FIG. 1 with an extruded covering.

Referring now to the drawings, the reinforced flexible laminate strip of the instant invention and the various features thereof are illustrated in FIGS. 1–12. Turning to FIG. 1 the flexible laminate strip 10, formed in accordance with the present invention, is shown. The laminate strip 10 has a continuous reinforcing wire 12. The wire 12 is formed into an undulating looped pattern that extends along the length of the strip 10. When the wire 12 pattern reaches the end of one pass at the edge of the strip 10, the wire 12 is bent forming a series of alternately opposing U-shaped retaining clips 14 running in a regularly spaced pattern throughout the strip 10. The wire 12 is bent into the undulating looped pattern using a wire bending machine (not shown) where the wire 12 is fed into the machine as straight stock and the bending machine bends the wire 12 into the desired configuration to form the retaining clips 14.

Figure 9:
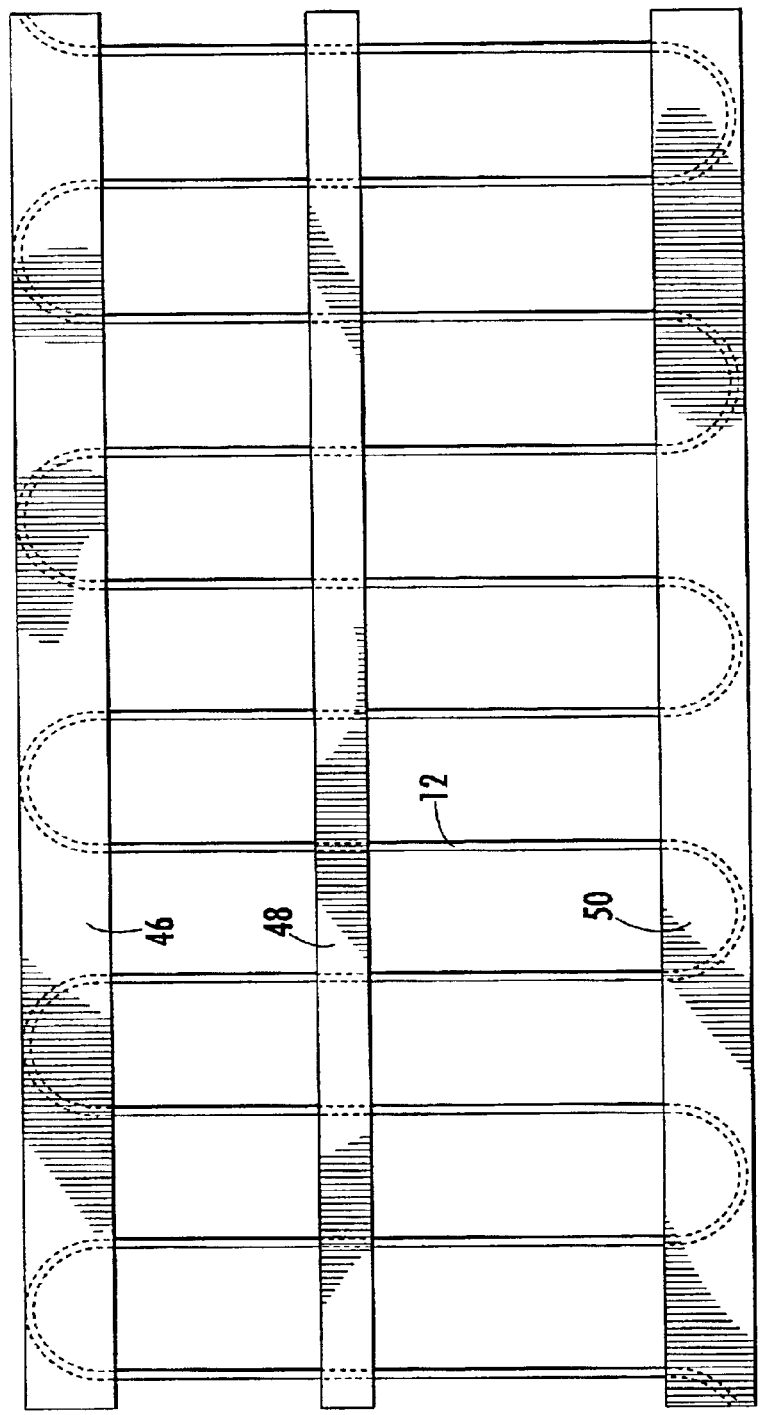
FIG. 9 is a plan view of the reinforcing wire of the present invention showing an alternative embodiment of the longitudinal reinforcing material.

At least one longitudinal reinforcing strand 16 is attached to the looped passes of the reinforcing wire 12 using an adhesive material such as an epoxy potting compound or other suitable adhesive known in the art. Alternatively, a woven or non-woven laminate, as shown in FIG. 9, may be employed instead of the strands. However, more than one reinforcing strand 16 is preferably used. The longitudinal reinforcing strands 16 or laminate are used to maintain the even spatial relationship between each of the wire 12 passes. Since subsequent manufacturing steps may include drawing the reinforcing wire 12 through an extrusion process, the longitudinal reinforcing strands 16 serve to maintain a uniform spacing of the retaining clips 14. The addition of the reinforcing strands 16 are an important improvement over the prior art in that as described above, no highly calibrated weaving machines are required to apply the longitudinal reinforcing strands 16 to the reinforcing wire 12.

The longitudinal strands 16, in the preferred embodiment, are preferably made of fiberglass although the material may also be an elastomeric material, EPDM rubber or a plastic film, woven laminate, non-woven laminate or knitted laminate material that can be effectively applied to the looped reinforcing wire 12. In some configurations, for example, no filament reinforcement 16 is required. The longitudinal strands 16 serve to transfer the tension of the extrusion process in a uniform linear fashion to each pass of the looped wire 12 to prevent the looped wire 12 from being bent or distorted thereby maintaining a uniform pattern of retaining clips 14 within the extruded strip 10. The present invention includes the use of at least one longitudinal strand 16 but may include a number of longitudinal strands 16 in various configurations across the width of the looped wire 12 pattern. The arrangement of the longitudinal strands 16 across the width of the looped wire 12 pattern is determined by the final application for which the strip 10 is to be used. In applications where the longitudinal forces applied during the extrusion process are great, a larger number of longitudinal strands 16 are applied to the looped wire 12 to resist and evenly distribute the extrusion forces. In addition, placement of longitudinal strands near the edges of the looped wire 12 pattern are adjusted based on the desired bending properties of the finished strip 10 as will be discussed below.

Once the longitudinal reinforcing strands 16 are applied to the looped wire 12, the assembly is drawn through an extruder to apply a filler material 18. As shown in FIG. 1, the filler material 18 is applied over both the looped wire 12 and the reinforcing strand 16 to fill in the voids 20 between each lateral pass of the looped wire 12. In this manner, a laminate strip 10 is formed that has a smooth outer surface appearance that reduces the telegraphed appearance of the looped wire 12 on the surface of the filler material 18. This appearance, known in the art as the "hungry horse", is when the looped wire 12 contained in the strip 10 stresses the surface of the filler 18 causing it to have a ribbed appearance. The filler material 18 is selected to be compatible with the material used in the finished application. Preferably, the filler material 18 is an EPDM rubber but may also be other elastomeric rubbers, thermoplastic, high durometer rubber, laminated rubber or combinations thereof. At this point in the process, the strip 10 of the present invention is sufficiently completed and may be offered to other manufacturers as raw material component substrate. Additionally, the strip 10 can be further processed as shown in FIG. 1a by further extruding an outer covering 19 onto the strip 10 of the present invention for incorporation into other forms of weather stripping material.

Figure 12:
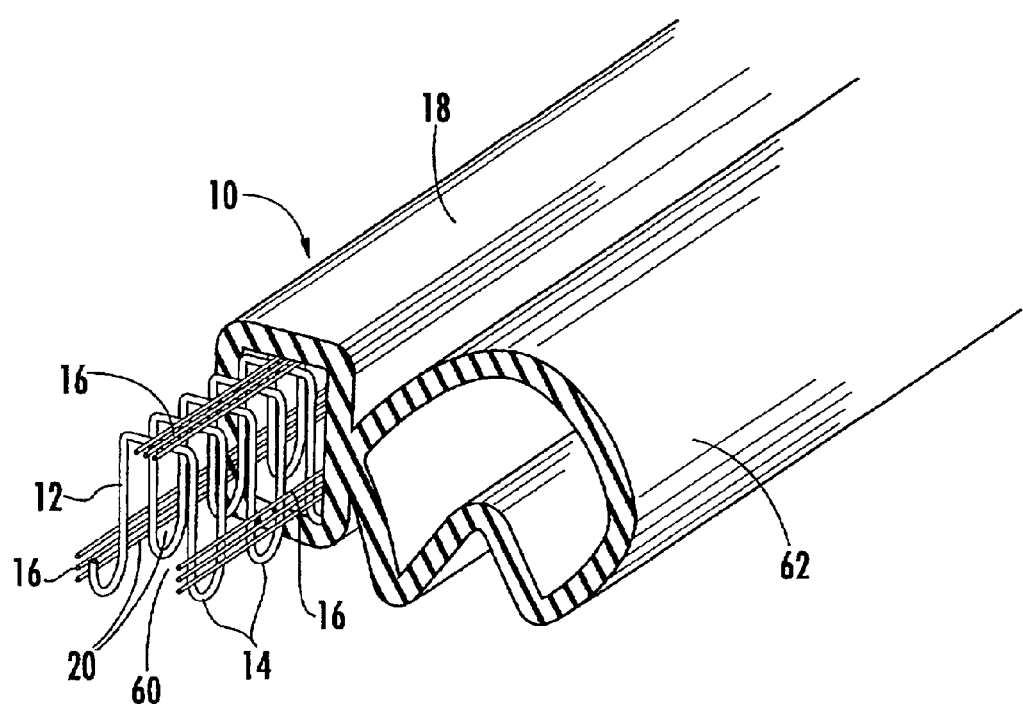
FIG. 12 is a perspective view of the reinforced laminate strip of the present invention incorporated into a finished weather stripping gasket.

For example, as shown in FIG. 12, the strip 10 can be further extruded to add an integral sealing element. Before further incorporating the strip 10 into a weather stripping product, the strip 10 of the present invention is normally bent using a roll-forming device into a U-shaped profile. By bending the strip 10 in this fashion, the ends of the retaining clips 14 are in an opposed relationship enabling the strip 10 to be used as weather stripping material by pressing the strip 10 onto the sheet metal edge (not shown) around a vehicle window, door or trunk opening. The retaining clips 14 exert a spring-biased force inwardly against the sheet metal edge thus retaining the weather stripping in place after installation.

Figure 3:
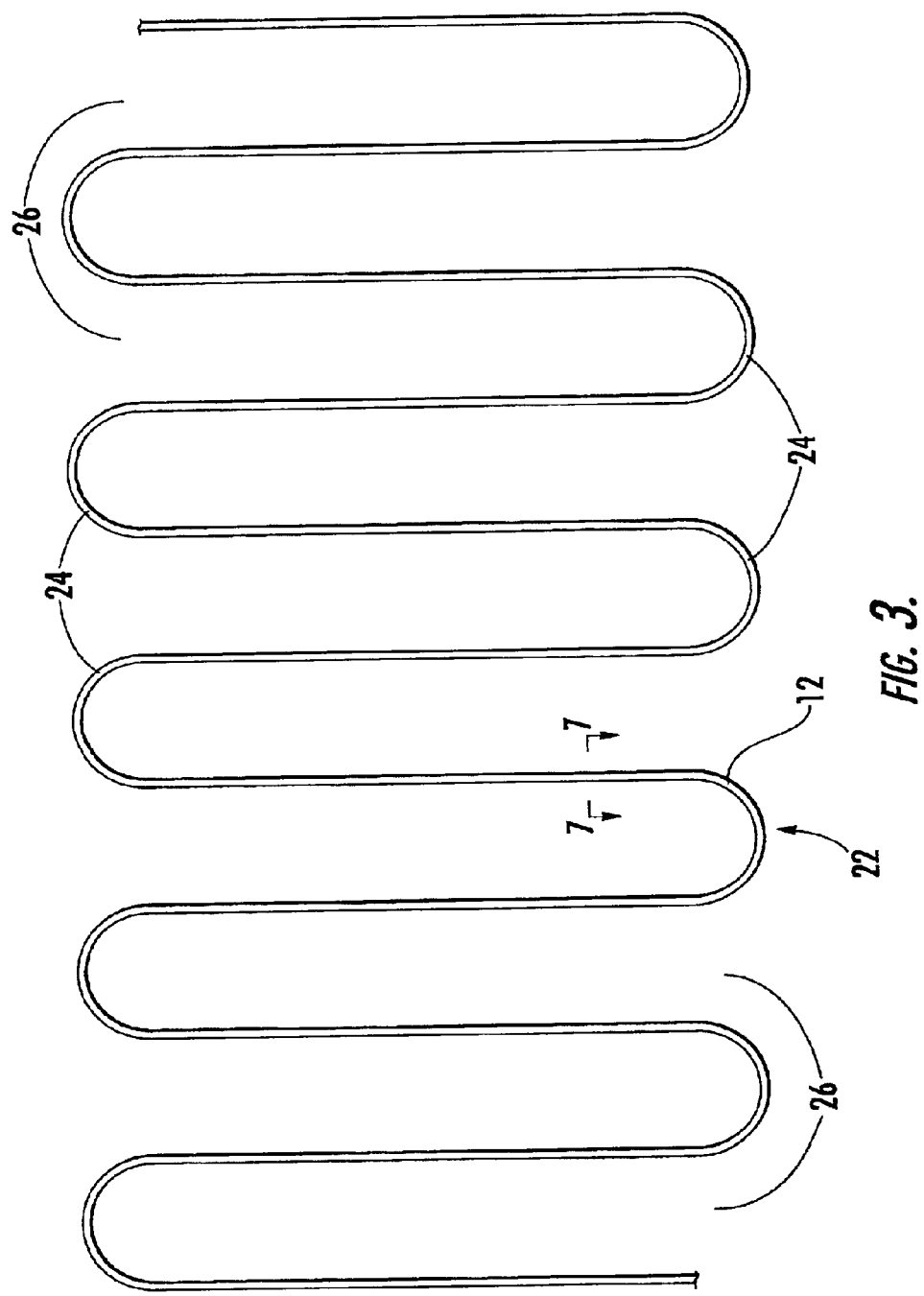
FIG. 3 is a plan view of the preferred embodiment of the reinforcing wire employed in the strip of FIG. 1.

Turning to FIGS. 3–6, various configurations of looped reinforcement wire 12 placement are shown for use in the strip 10 as shown in FIG. 1 of the present invention. FIG. 3 shows a bent wire pattern 22 having symmetrical wire loops. The placement provides for clip loops 24 that are equal in dimension along both edges of the strip 10. Because the loop pattern 22 is symmetrical, spaces 26 are provided along each side of the strip 10 equal in width to the clip loops 24. This allows for a finished product that can be flexed equally well in either an inside or outside curve.

Figure 4:
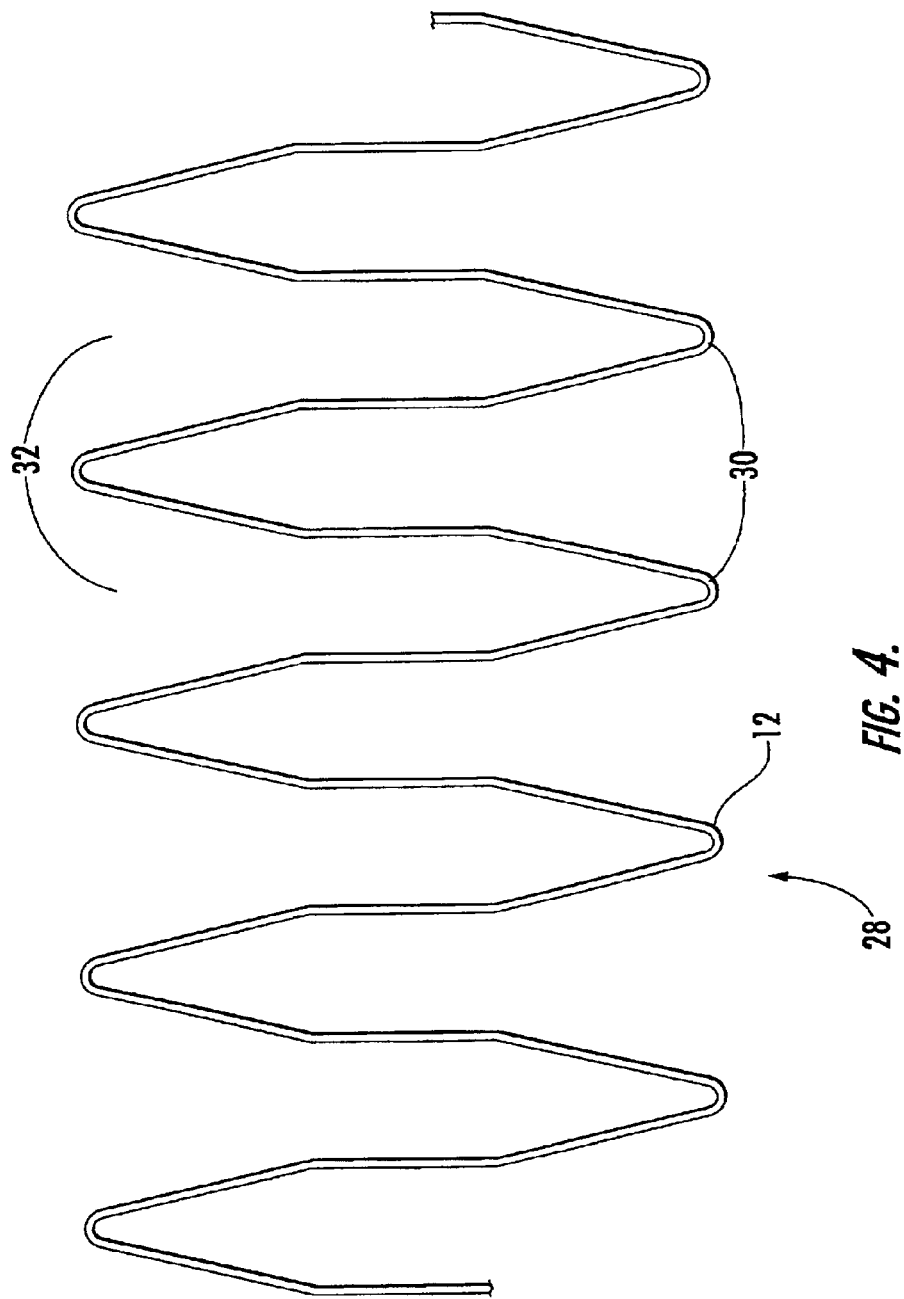
FIG. 4 is a plan view of an alternate embodiment of the reinforcing wire employed in the strip of FIG. 1.
Figure 5:
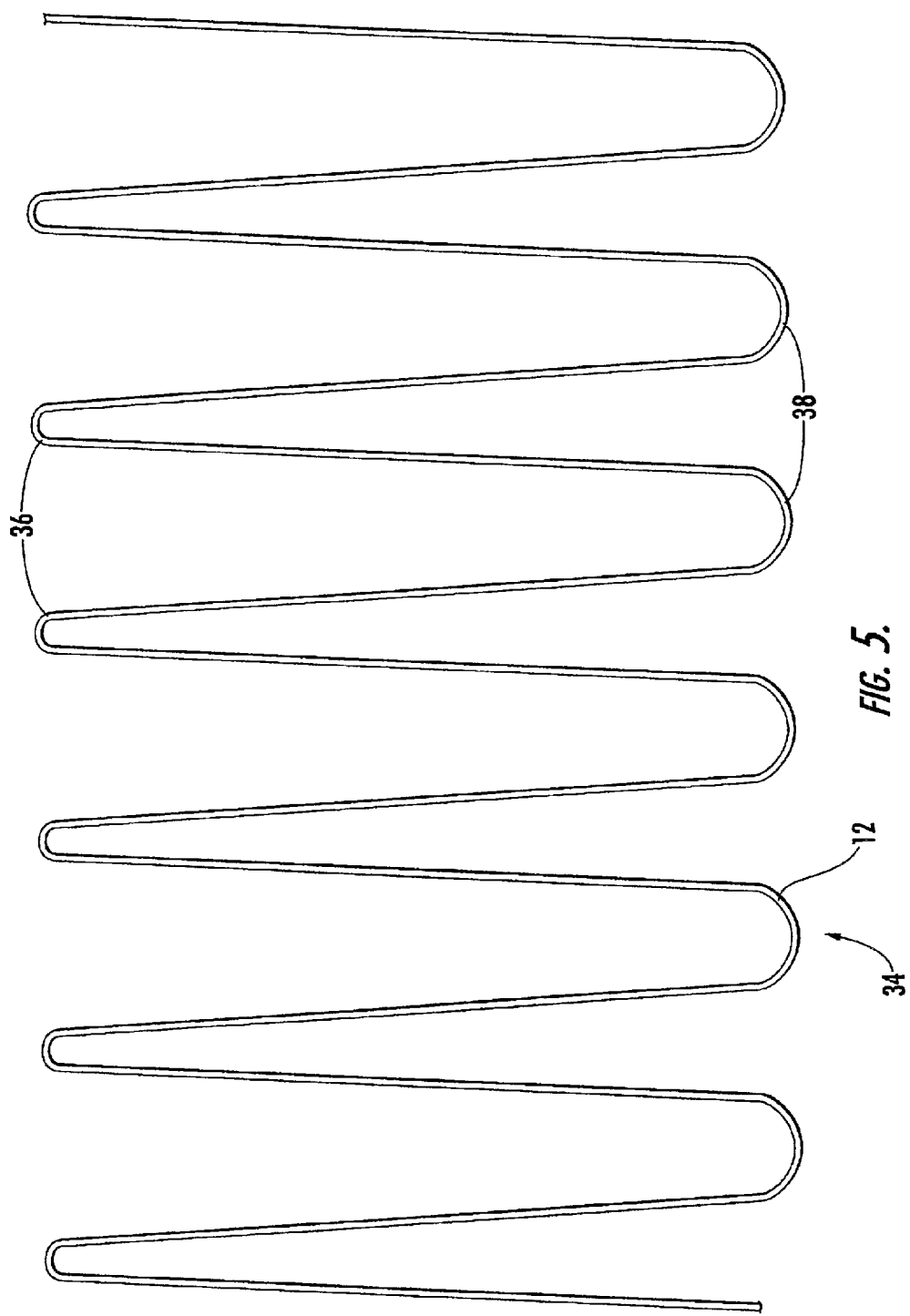
FIG. 5 is a plan view of a second alternate embodiment of the reinforcing wire employed in the strip of FIG. 1.
Figure 6:
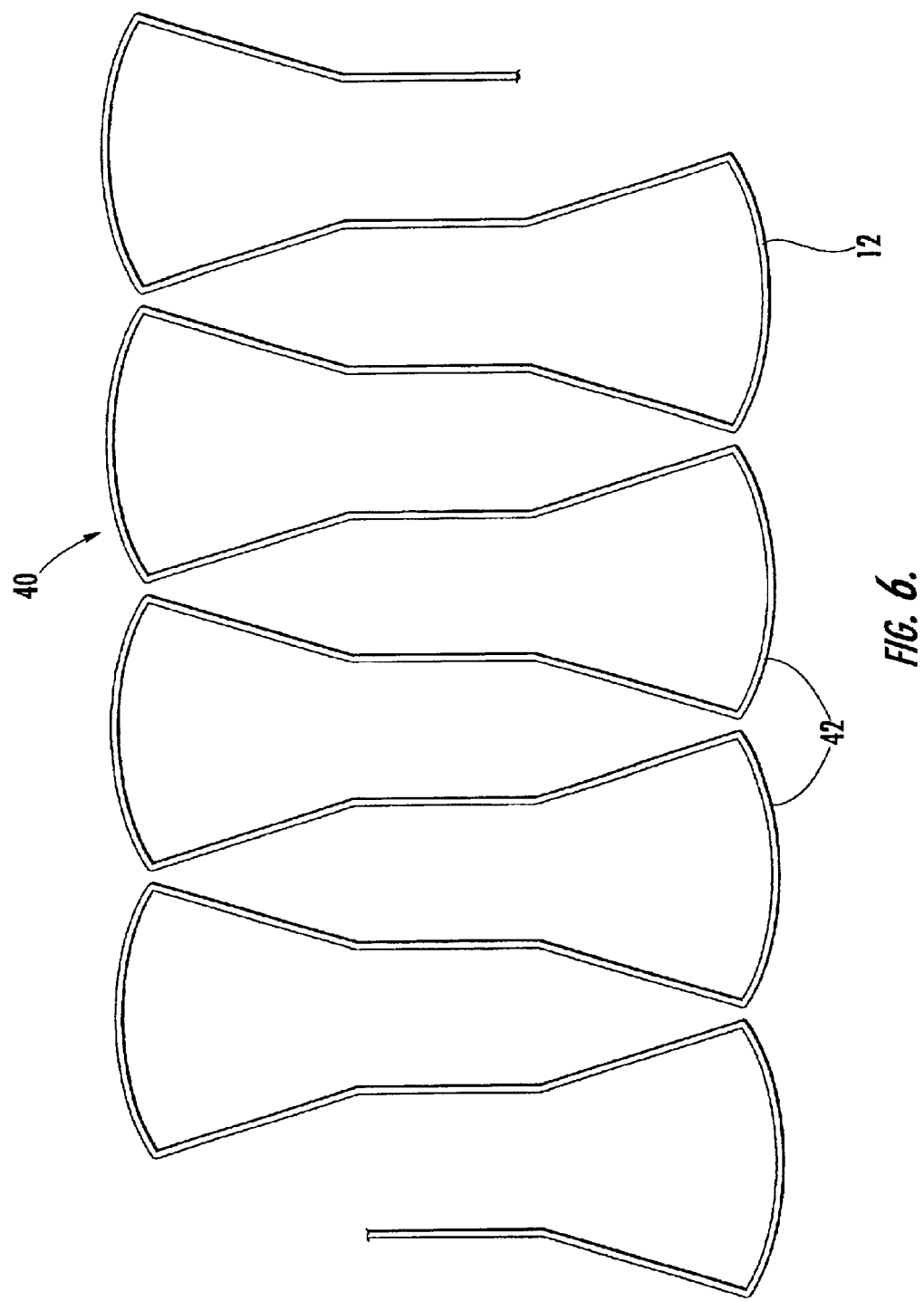
FIG. 6 is a plan view of a third alternate embodiment of the reinforcing wire employed in the strip of FIG. 1.

Turning to FIG. 4, a wire pattern 28 of looped reinforcement wire 12 is shown where the clip loops 30 are bent into a tapered configuration. Because the clip loops 30 are very small and have large spaces 32 between them, the finished strip is permitted to be bent in a very tight radius before the clip loops 30 contact one another. FIG. 5 shows yet another embodiment of a wire pattern 34 for looped reinforcing wire 12, in accordance with the present invention, having smaller wire loops 36 on one side and larger wire loops 38 on the other side of undulating wire 12. This wire pattern 34 allows the finished strip 10 to have improved bending in the direction of the smaller loops 36 with greater rigidity in the direction of the larger loops 38. The wire pattern 40 shown in FIG. 6 has flared clip loops 42 that allow the strip 10 to bend while providing broad contact of the clip loops 42 with the substrate (not shown) to provide improved torsional rigidity for the weather stripping when installed. Thus, the structural pattern of wire 12 can be configured to meet the structural needs of the environment into which the strip 10 is installed.

Figure 7A:
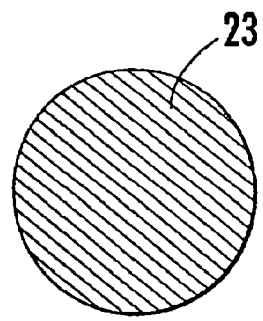
FIG. 7A is a cross-sectional view through the line 7—7 of FIG. 2 showing a wire of a circular cross-section.
Figure 7B:
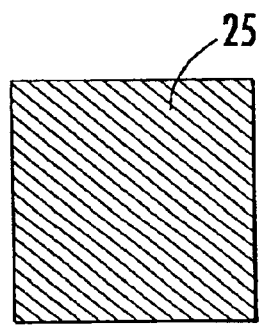
FIG. 7B is a cross-sectional view through the line 7—7 of FIG. 2 showing a wire of a polygonal cross-section.
Figure 7C:
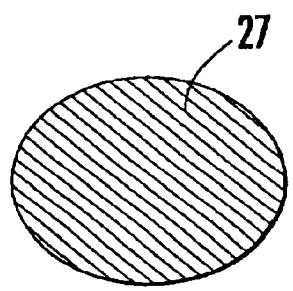
FIG. 7C is a cross-sectional view through the line 7—7 of FIG. 2 showing a wire of an oval cross-section.

FIGS. 7A, 7B and 7C show the various possible cross sections for the reinforcement wire 12. The reinforcement wire 12 preferably has a round cross-section 23 as shown in FIG. 7A. Also, the reinforcing wire 12 may also have a polygonal cross-section 25, such as square or rectangular, as shown in FIG. 7B. Further, the wire 12 may also have an oval cross-section 27, as shown FIG. 7C. Other cross-sectional configurations may be employed to suit the application and environment at hand.

Figure 8:
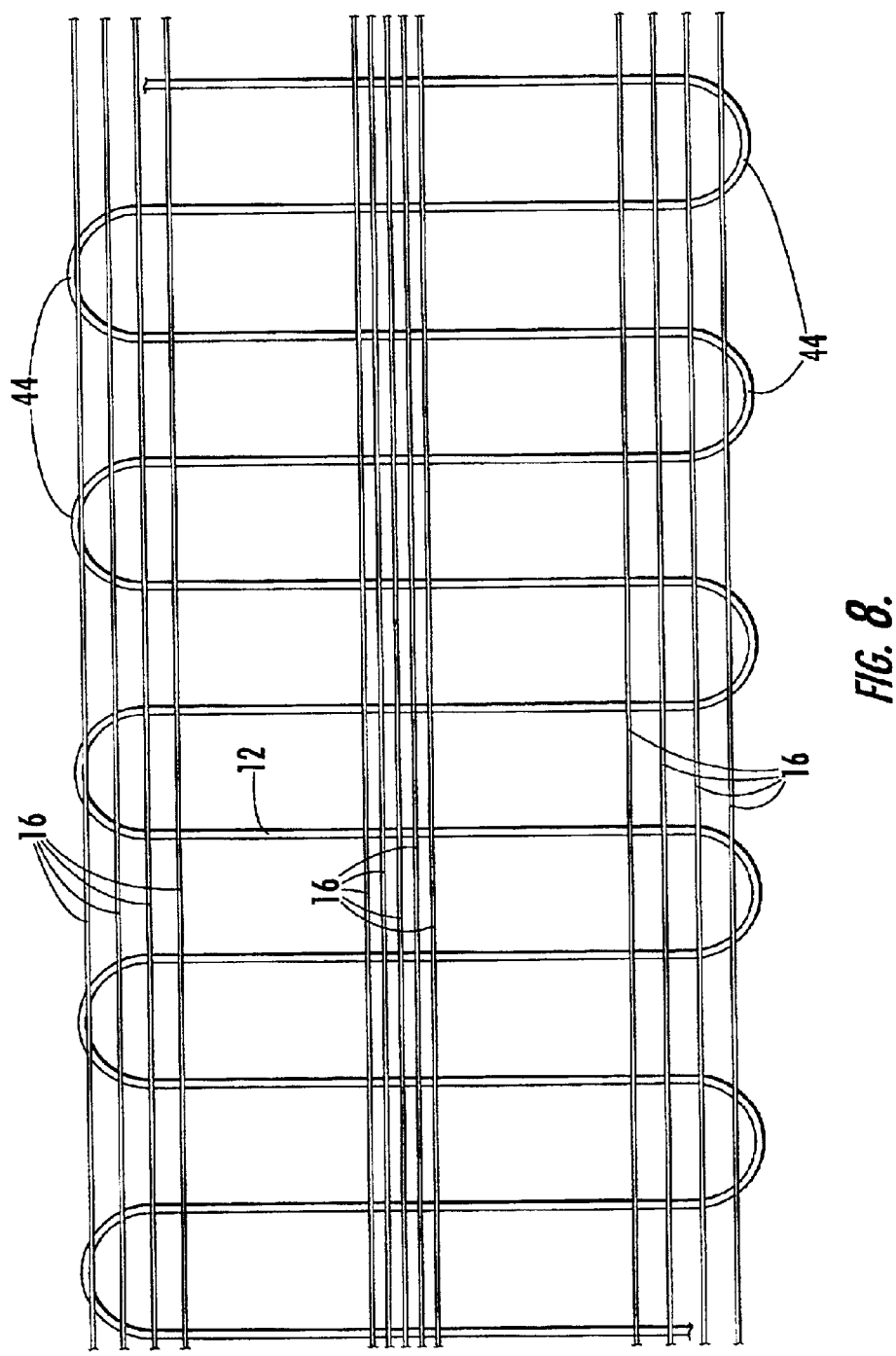
FIG. 8 is a plan view of the reinforcing wire employed in the strip of the present invention of FIG. 1 showing the preferred embodiment of the longitudinal reinforcing material.

FIGS. 8–11 show various configurations for placement of the longitudinal reinforcing strands 16. FIG. 8 shows the preferred placement of the longitudinal reinforcing strands 16. The preferred material for the strands 16 is a fiberglass yarn. At each point where the strand 16 intersects the looped wire 12 it is fastened with a suitable adhesive. This configuration allows the looped wire 12 to be drawn through an extrusion process without deformation or bending of the uniform spacing of the loops 44 formed in looped wire 12. Depending on the final application for strip 10, the number of reinforcing strands 16 used is varied. In some applications where the longitudinal stresses of the subsequent extrusion process are low, no reinforcing strand 16 need be applied to looped wire 12. As the longitudinal stresses of the extrusion process increase, additional reinforcing strands 16 are applied to looped wire 12 to increase the ability of the assembly of looped wire 12 and reinforcing strands 16 to resist longitudinal deformation. This can also be accomplished with a laminate material. Further, where reinforcing strands 16 are placed near the edges of the looped wire 12 the finished strip 10 becomes restrained against longitudinal extension and therefore has greater dimensional stability. The extent to which the final application requires restraining the finished strip 10 to preserve dimensional stability is used to determine the number and placement of longitudinal reinforcing strands 16 across the width of the looped wire 12 pattern.

FIG. 9 shows an alternative material for use as a longitudinal reinforcing strand 16. Strips of laminate material 46, 48 and 50 may be applied onto the looped wire 12 either using adhesive or other bonding methods. These strips 46, 48 and 50 may all be of the same material or may each be of a different material depending on the desired characteristics of the finished strip 10. The materials used are selected from elastomers, rubbers or thermoplastics. Further, strips 46, 48 and 50 may be woven laminate, non-woven laminate or knitted laminate to suit the application at hand. As an example, the center strip 48 may be a rigid thermoplastic imparting a rigidity to the finished strip 10 in the up and down bending axis while one side strip 46 may be a low durometer EPDM material and the other side strip 50 may be a harder high durometer rubber to provide for a directional bending strip 10 that is more flexible in one direction than in the other.

Figure 10:
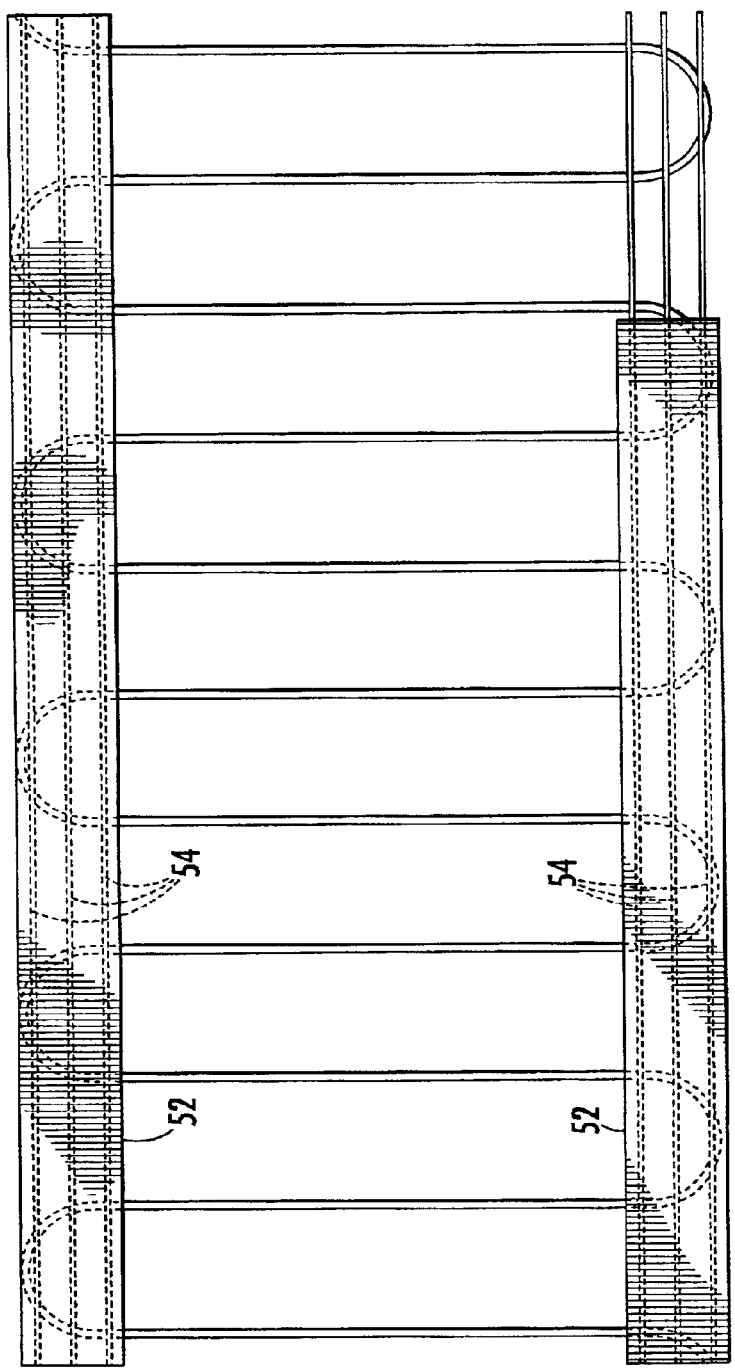
FIG. 10 is a plan view of the reinforcing wire of the present invention showing a second alternative embodiment of the longitudinal reinforcing material.
Figure 11:
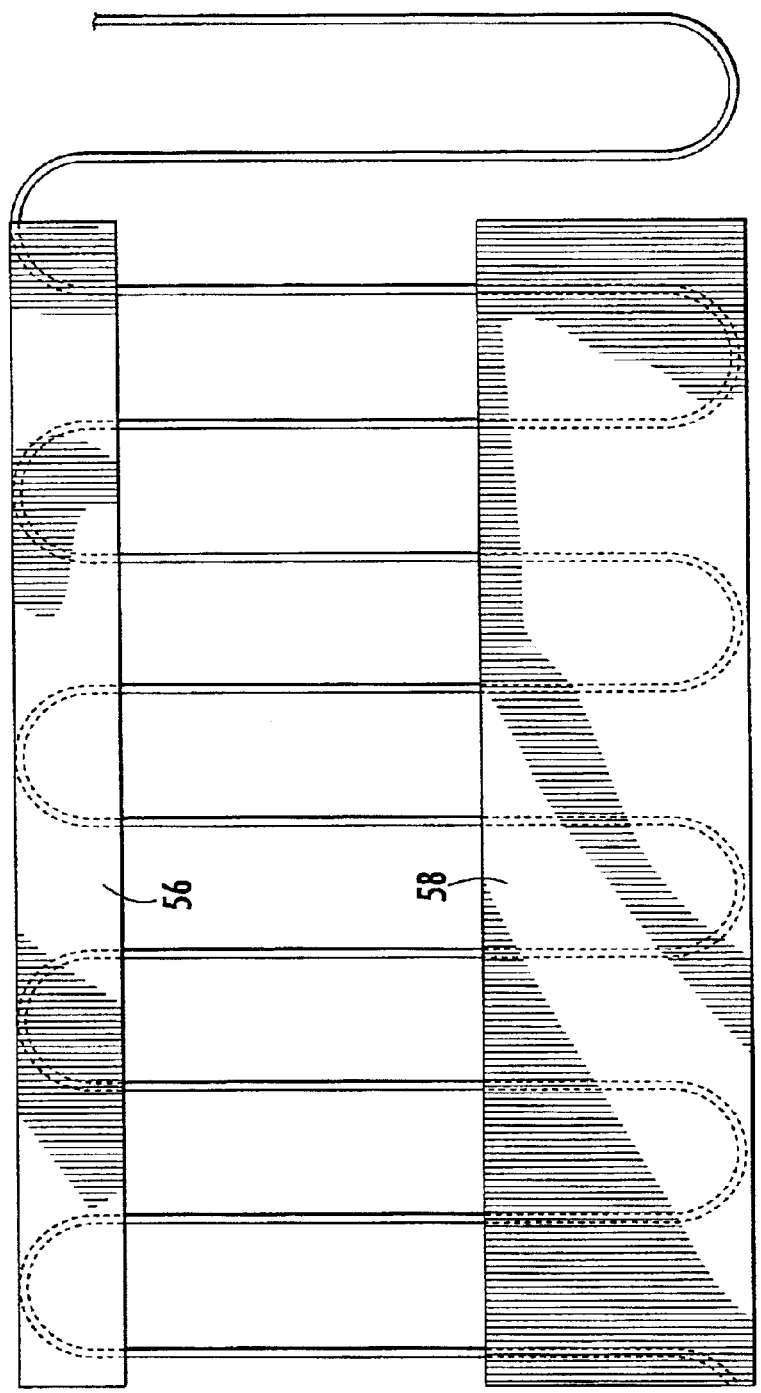
FIG. 11 is a plan view of the reinforcing wire of the present invention showing a third alternative embodiment of the longitudinal reinforcing material.

Further, FIG. 10 illustrates the use of laminate strips 52 in combination with fiberglass yarns 54 where the fiberglass yarns 54 are imbedded within the laminate strip 52 material. Finally, FIG. 11 illustrates the use of longitudinal strips 56 and 58 to provide improved masking of the "hungry horse" effect. A wider longitudinal strip 58 is, for example, applied toward the outside of the finished product.

FIG. 12 illustrates the strip 10 of the present invention bent into a U-shaped profile, as described above. The strip 10 has the looped reinforcement wire 12 with longitudinal reinforcement strands 16 attached to the wire 12. Retaining clips 14 are bent into a downward position creating a channel 60 to receive the sheet metal edge of an automobile door, window or trunk opening (not shown) therein. Further, a filler material 18 is shown extruded over the wire 12 and longitudinal reinforcement 16 and into the voids 20 between the looped wire 12 and a sealing element 62 is shown attached to one leg of the bent strip 10. The sealing element 62 is bulbous in shape and is generally compressible. When the door, window or trunk lid is in a closed position, the sealing element 62 is compressed forming an effective seal. The strip 10 portion of the present invention effectively retains the sealing element 62 in the required operative position. The filler material 18 used in the present invention is selected to be compatible with the material that is used to form the sealing element 62 so that the overall product has a uniform finished appearance.

The present invention represents an improvement over the prior art in that the looped reinforcing wire 12 and the non-woven longitudinal carrier strands 16 combine to produce a laminate strip having reduced raw material weight and an improved flexibility. The prior art carriers that employed stamped or expanded metal require a much higher percentage by weight of raw metal to produce the desired product. This results in a higher cost for production. Additionally, these metal sections are much less flexible than the present invention. Further, the prior art designs that employ knitted strand carriers cannot produce bent wire patterns where each pass of the wire is straight and parallel to the previous pass. As a result, the wire reinforcing pattern in these cases is not symmetrical and balanced, therefore, imparting uneven bending properties to the finished product.

It can therefore be seen that the instant invention provides a novel weather stripping retention strip 10 having improved flexibility and provides for reduced cost in manufacturing. Since the looped reinforcing wire 12 has a uniform even pattern that is maintained throughout the entire process, the finished strip 10 has an improved consistency when bending. In addition, since the wire 12 is more flexible than the stamped or expanded metal carriers used previously, the finished strip 10 has improved bending characteristics.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A reinforced flexible laminate strip assembly having a strip width and a strip length, comprising:

a plurality of non-knitted metal dips disposed in a spaced pattern and being a continuous strand of wire transversely looped back and forth across the strip width in a plurality of adjacent passes to form a first leg, a bend, second leg and a longitudinally running center line, wherein said second leg of each pass also forms said first leg of the clip formed in the next pass, said adjacent passes of wire having voids located therebetween, said spaced pattern extending the strip length; said first and second legs of said clip of the continuous strand of wire form a straight line inwardly tapered V-shaped junction at said bend; and at least one longitudinal member, adhesively connected to said continuous strand of wire maintaining said spaced pattern of said clips.

2. The reinforced flexible laminate strip assembly of claim 1, further comprising:

filler material disposed in said voids.

3. The reinforced flexible laminate strip assembly of claim 2, further comprising:

a cover layer disposed about the plurality of metal clips, the at least one longitudinal member and the filler material.

4. The reinforced flexible laminate strip assembly of claim 3, further comprising:

a sealing element connected to said cover layer.

5. The reinforced flexible laminate snip assembly of claim 3, wherein said strip has a U-shaped profile with two legs; said sealing element being connected to one of said two legs.

6. The reinforced flexible laminate strip assembly of claim 1, wherein each of said clips has a circular cross-section.

7. The reinforced flexible laminate strip assembly of claim 1, wherein each of said clips has a polygonal cross-section.

8. The reinforced flexible laminate strip assembly of claim 1, wherein each of said clips has an oval cross-section.

9. The reinforced flexible laminate snip assembly of claim 1, wherein said laminate strip has a U-shaped profile.

10. The reinforced flexible laminate strip assembly of claim 1, wherein said at least one longitudinal member is a plurality of longitudinal members made of the same material.

11. The reinforced flexible laminate strip assembly of claim 1, wherein said at least one longitudinal member is a plurality of longitudinal members made of different materials.

12. The reinforced flexible laminate strip assembly of claim 1, wherein the at least one longitudinal member is made of a material is selected from the group consisting of: elastomeric rubber, thermoplastic, high durometer rubber, fiberglass strand, laminated rubber, woven laminate, non-woven laminate and knitted laminate and combinations thereof.

13. The reinforced flexible laminate strip assembly of claim 1, wherein said first and second legs of said clip are substantially parallel along the entire strip length.

14. The reinforced flexible laminate strip assembly of claim 1, wherein said continuous strand of wire has a circular cross-sectional shape.

15. The reinforced flexible laminate strip assembly of claim 1, wherein said continuous strand of wire has a square cross-sectional shape.

16. The reinforced flexible laminate strip assembly of claim 1, wherein said continuous strand of wire has a rectangular cross-sectional shape.

17. The reinforced flexible laminate strip assembly of claim 1, wherein said continuous strand of wire has an oval cross-sectional shape.

18. The reinforced flexible laminate strip assembly of claim 1, further comprising:
   at least one mask layer adhered onto the continuous pie-farm strand of wire.

19. The reinforced flexible laminate strip assembly of claim 18, the wherein the at least one mask layer is selected from the group consisting of: elastomeric rubber, thermoplastic, high durometer rubber, fiberglass strand, laminated rubber, woven laminate, non-woven laminate and knitted laminate and combinations thereof.

20. The reinforced flexible laminate strip assembly of claim 18, wherein the at least one mask layer is adhered to the continuous strand of wire along the entire length of the laminate strip.

21. The reinforced flexible laminate strip of claim 18, wherein the at least one mask layer is two separate layers spaced apart from one another and respectively adhered to the continuous strand of wire.

22. The reinforced flexible laminate strip of claim 18, wherein the at least one mask layer is three separate layers spaced from one another and adhered to the continuous strand of wire.

23. The reinforced flexible laminate strip of claim 1, wherein the continuous strand of wire transversely looped back and forth across the strip width is asymmetrical about the longitudinally running center line.

* * * * *